United States Patent

Weisser et al.

[11] 4,355,908
[45] Oct. 26, 1982

[54] DEVICE FOR MEASURING THE MASS FLOW AND THE HEAT FLOW AND METHOD FOR DETERMINING THE MASS FLOW

[75] Inventors: Günter Weisser; Bernd Starkloff, both of Bad Homburg von der Hohe; Klaus Stoesser, Hofheim, all of Fed. Rep. of Germany

[73] Assignee: Battelle-Institut e.V., Frankfurt am Main, Fed. Rep. of Germany

[21] Appl. No.: 122,066

[22] Filed: Feb. 15, 1980

[30] Foreign Application Priority Data

Feb. 17, 1979 [DE] Fed. Rep. of Germany ....... 2906186
Nov. 6, 1979 [DE] Fed. Rep. of Germany ....... 2944707

[51] Int. Cl.³ .............................................. G01K 17/08
[52] U.S. Cl. ........................................ 374/39; 73/204
[58] Field of Search .................... 73/15 R, 204, 193 R

[56] References Cited

U.S. PATENT DOCUMENTS

| 2,193,762 | 3/1940 | Hirsch et al. | 73/204 |
| 2,633,747 | 4/1953 | Lindstrom | 73/193 |
| 2,633,748 | 4/1953 | Lindstrom | 73/193 |
| 2,633,749 | 4/1953 | Lindstrom | 73/193 |
| 3,918,300 | 11/1975 | Weisstuch et al. | 73/15 |

FOREIGN PATENT DOCUMENTS

2353045 12/1977 France.
607001 11/1978 Switzerland.

*Primary Examiner*—Herbert Goldstein
*Attorney, Agent, or Firm*—Fisher, Christen & Sabol

[57] ABSTRACT

To measure the heat flow and the mass flow in a conveying system for fluids, a device is used which consists of (i) two fluid-carrying tubes, one mounted in the feed line and one in the return line, (ii) a heat-conducting section between these two tubes and (iii) temperature sensors. The heat-conducting section is made of material of low thermal conductivity, e.g., glass or a composite such as enamel or plastic-coated steel. It is designed such that the heat transmission through the heat-conducting section is lower than the heat transfer at the two interfaces between the fluid and heat-conducting section. At or close to the ends of the two heat transfer zones in the feed and return lines the temperatures or temperature differences of the fluid are measured and the heat flow or mass flow is derived from the results of these measurements.

24 Claims, 5 Drawing Figures

DEVICE FOR MEASURING THE MASS FLOW AND THE HEAT FLOW AND METHOD FOR DETERMINING THE MASS FLOW

BACKGROUND OF THIS INVENTION

1. Field of this Invention

The invention relates to a device for measuring the mass flow and the heat flow. The invention device consists essentially of two fluid-carrying tubes, one mounted in the feed line and one in the return line, of a heat-conducting section between these two tubes and of temperature sensors in the tubes. In addition, the invention relates to a method for determining the mass flow in a conveying system for fluids. The invention permits the heat flow and the mass flow to be measured in closed heat transfer systems; it is particularly suitable for determining the fuel oil or fuel consumption in heating systems or internal combustion engines.

2. Prior Art

Heating systems are usually checked for optimum efficiency and adjusted by specialists at regular intervals. The boiler efficiency is calculated on the basis of the exhaust gas temperatures and compositions. The performance of these measurements involves a substantial amount of effort. An easy method for the permanent monitoring of the boiler efficiency would, however, consist in a comparison of the amount of heat emitted with the fuel consumption. The heating costs are calculated on the basis of evaporation calorimeters attached to the radiators, which have to be serviced and read by special servicing companies. These meters do not permit accurate reading and involve systematic errors. Thus, it is possible that heating of the radiator by other heat sources such as solar irradiation may lead to incorrect measuring results. Evaporation calorimeters are not suitable for determining the heat consumption at a specific point in time. In addition, summation of the heat consumption in the entire apartment cannot be automated.

Furthermore, it is known that the heat consumption in a whole building can be determined by means of heat meters mounted at the connection point to the district heating system. In general, these contain mechanical flowmeters in the form of little turbine wheels, spring lock washers, floats or Pitot-tubes. As a rule, these mechanical components are not very reliable. Other known methods of measuring the flow volume, e.g. by means of ultrasonics or inductive measuring equipments, are too sophisticated for this purpose.

A known device for the measurement of amounts of heat consists in a solid-state bridge between feed line and return line and temperature measuring points also within the heat-conducting connection (German Patent Application No. 2,330,498). The solid-state bridge is realized as a pile of disks. In addition, calorimeters for the same purpose are known, which consist essentially of hollow, heat-conducting bodies between feed line and return line and thermocouples arranged in these bodies (German Patent Specification No. 884,577; U.S. Pat. Nos. 2,633,747 and 2,633,748). In all these devices the temperature has to be measured within the bridge, and in some cases both inside and outside the bridge, which requires a complex design. In addition, the accuracy of the measured values is insufficient.

At present the consumption of fuel oil or fuels is determined for extended periods of time as an integral value each time the tank is filled. However, to be able to examine heating systems or car engines for energy-saving operation at any time, the instantaneous consumption, the flow volume or, that is, the mass flow must be known.

For reasons of cost, the presently used methods for measuring the flow volume are exclusively mechanical processes. The devices used may be rotating vane meters, which usually fail after a certain service life as a result of soiling and which do not permit accurate measurement in the case of small flow volumes. Other devices, e.g. spring-lock-washer, float, Pitot-tube, ultrasonic or inductive flowmeters in part cannot be used for technical reasons and in most cases are too expensive.

BROAD DESCRIPTION OF THIS INVENTION

The object of the present invention is to provide a device of simple design which permits the short-term, i.e. instantaneous, and the integral mass flow or flow volume and the heat flow to be determined with high accuracy in a simple manner merely by measuring temperatures in a fluid, thereby avoiding the drawbacks of the conventional methods stated above.

It has been found that this object can be achieved if in a device of the type indicated above the heat-conducting section consists of a material of low thermal conductivity and is designed such that the heat transmission through the heat-conducting section is lower than the heat transfer at the two interfaces between the fluid and the heat-conducting section. Or in other words, the heat-conducting section has heat transmission properties such that the heat-conducting section has a thermal impedance which is relatively higher than the thermal impedance of each of the two interfaces between the fluid and the heat-conducting section.

Preferably the interfaces between the fluid and the heat-conducting section (5) each have a large surface area. Preferably temperature measuring points $T_1$, $T_2$, $T_3$, and $T_4$ are each arranged close to a separate end of the heat transfer zones to the heat-conducting section (5) in the fluid-carrying tubes (1-2 and 3-4) and are connected to an electronic unit for evaluating the measured values. Preferably only three of the four possible temperature measuring points $T_1$, $T_2$, $T_3$ and $T_4$, upstream and downstream of the heat-conducting section (5) in the fluid-carrying tubes (1-2 and 3-4), are provided with a temperature sensor and that two differences can be formed from the three measured values and supplied to the evaluating unit. Preferably the fluid-carrying tubes (1-2 and 3-4) are connected, their partition wall serving as the heat-conducting section (5). Preferably the fluid-carrying tubes (1-2 and 3-4) are arranged concentrically in countercurrent flow, the wall of the internal fluid-carrying tube serving as the heat-conducting section (5). Preferably the heat-conducting section (5) consists of glass or a composite material, e.g., enamel- or plastic-coated steel. Preferably a consumption line (8) is branched off between the fluid-carrying tubes (1-2 and 3-4) to determine the mass flow. Preferably the fluid-carrying tubes (1-2 and 3-4) are connected by a cooling or heating zone (9).

This invention includes a method for determining the mass flow in a conveying system for fluids. The method includes measuring the temperatures or temperature differences of the fluids at or close to the ends of the two heat transfer zones in the feed line and the return line. A temperature change is produced between the fluid in the feed line and the return line and a defined amount of heat is conveyed per unit time from the feed line to the return line or vice versa through a heat-conducting section. The mass flow of the fluid is derived from the measured temperature differences. In one embodiment, a temperature change of less than 5° C. is produced between the fluid in the feed line and the fluid in the return line. On one embodiment, the heat transfer at the interfaces between the heat-conducting section and fluid is high and the thermal conductivity within the heat-conducting section is low. In one embodiment, the difference of the mass flows in the feed line and the return line is formed in order to determine the mass flow in the consumption line of a conveying system operating according to the circulation principle. In one embodiment, the temperature change between the feed line and the return line is produced downstream of the branching point of the consumption line.

The heat-conducting section can be implemented in different ways. An essential requirement is, however, that a measurable temperature difference must be produced between the feed line and the return line of the fluid.

To achieve proportionality between temperature difference and amount of heat supplied or removed, it is ensured that the effect of heat conduction exceeds that of surface heat transfer. This can be achieved, for example, by using a material of comparatively low thermal conductivity, e.g. glass. The heat-conducting section may consist, for example, of a special countercurrent heat exchanger. The essential requirement is that the heat transmission (solid) is as low as possible and the heat transfer (fluid/solid and solid/fluid) is as high as possible. This can be achieved, e.g., by connecting the feed line with the return line and providing a partition wall having an enlarged surface area. It is also possible to create bottlenecks in the heat exchanger, e.g. by specific hollow parts or heating or cooling fins. Thorough mixing of the fluid can be achieved, for example, by providing filling material, e.g. glass spheres. The heat-conducting section and the temperature measuring points must be well insulated from the outside.

The large surface area necessary for optimum heat transfer from the fluid to the solid heat-conducting section can also be obtained by using a composite material. If materials such as enamel or plastics, e.g. Teflon-,—which, however, have to be applied to a carrier material—are used as solid heat-conducting section, their heat conductivity is so low that a sufficiently large surface area is ensured. In the case of concentric design of the fluid-carrying tubes, in which the fluids are conveyed countercurrently i.e. the cold fluid outside and the warmer fluid inside, the desired effect can be achieved if a steel tube of about 2 mm thickness is coated on one or both sides with enamel in a thickness of 1 mm or with plastic materials in layer thickness of about 0.1 mm.

The necessary temperature or temperature difference measurements are preferably made at suitable points on the external wall of the fluid-carrying tubes using thermocouples, N.T.C. resistors or transistors. The temperatures or temperature differences are preferably measured in the feed and return lines immediately at or close to the ends of the two heat transfer zones, i.e. related to the direction of flow:

(a) at the beginning and at the end of the heat-conducting section in the feed line ($T_1$-$T_2$), (b) at the beginning and at the end of the heat-conducting section in the return line ($T_4$-$T_3$), (c) at the beginning of the heat-conducting section in the feed line and in the return line ($T_1$-$T_4$), (d) at the end of the heat-conducting section in the feed line and in the return line ($T_2$-$T_3$).

Preferably, only three of the four possible temperature measuring points at the beginning and the end of the heat conducting section in the feed line and the return line should be provided with temperature sensors, and two differences should be formed from the three measured values, e.g. $T_1$-$T_2$ and $T_1$-$T_4$ or $T_4$-$T_3$ and $T_2$-$T_3$ or $T_1$-$T_2$ and $T_2$-$T_3$ or $T_4$-$T_3$ and $T_1$-$T_4$, which arrive at the evaluating unit. The mass flow or the heat flow can be derived from the temperature differences.

According to the invention, in order to determine the mass flow, first a small, not accurately defined temperature change of less than 10° C., preferably less than 5° C. and in particular 3° C., is produced between the feed line and the return line, and second a defined amount of heat is conveyed per unit time from the feed line to the return line or vice versa.

The necessary temperature change can be achieved by cooling or slight heating the fluid. In the case of conveying systems operating according to the circulating principle, where the consumption line is branched off, it is advantageous to mount the cooling or heating device downstream of the branch point of the consumption line, in order to ensure that only the fluid in the return line has to be heated or cooled. This is not applicable, however, to systems, e.g. motor vehicles, where the necessary and not accurately defined temperature change is produced by modern carburetors or injection pumps according to the system design. In such systems the consumption is determined from the difference between the mass flows in the feed line and the return line. It is thus possible to determine the heat flow, i.e. the amount of heat quantity per unit time, and the mass flow can be determined without using any mechanical components. The device according to the invention measures exclusively temperatures or temperature differences, supplies the resultant data directly in the form of electric quantities and processes them electronically as required. The measured values are preferably converted into electric signals, converted from analog to digital, smoothed mathematically by a microprocessor, and processed further. Thus, it is possible to monitor, control and make accounts from any position.

The invention is described below in detail on the basis of the drawings, wherein.

Figure 1:
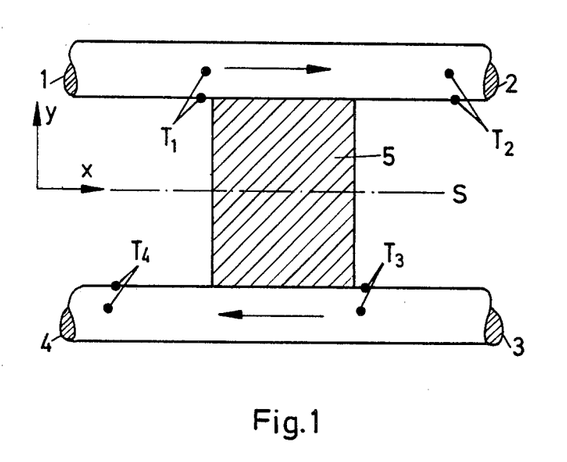
FIG. 1 is a side elevational view of a heat-conveying system with a heat-conducting section between a feed line and a return line.

FIG. 1 is a schematic representation of a heat-conveying system which may be either a hot-water heating or a cooling system. In the following the use of the device according to the invention in hot-water heating is described. Between points 1 and 2 a piece of the feed line is plotted in which the hot water flows from 1 to 2 and is at the higher temperature level. Between 3 and 4 there is the return line in which the water flows from 3 to 4 and is at the lower temperature level. Heat conducting section 5, which is plotted as a hatched area, is installed between feed line and return line. Heat conducting section 5 may be implemented, for example, in the form of a heat exchanger in heat-conducting material, which in this context has been assumed, for simplicity, to be geometrically symmetric to the axis of symmetry S. In addition, it is assumed that the feed line, return line and heat exchanger unit are sufficiently heat-insulated with respect to the ambient temperature.

In this system the hot water of temperature $T_1$ passes the temperature measuring point 1 and remains at the temperature level $T_1$ until heat exchanging starts. From this point an amount of heat to be determined later is conveyed through heat-conducting section 5 to the return line, so that the water in feed line behind the heat-conducting section 5 has a lower temperature $T_2$ at which it passes the temperature measuring point 2. After having been passed through the hot-water heating, the water reaches the temperature measuring point 3 at temperature $T_3$. Through heat-conducting section 5 a specific amount of heat is conveyed from the feed line to the water in the return line, so that it has the higher temperature $T_4$ after having passed heat conducting section 5, which it still has at the temperature measuring point 4. Subsequently it is reheated to temperature $T_1$ by means of the heating system, e.g. boiler, district heating.

If the specific heat of the hot water equals that of the colder water, the following relations apply:

$$\Delta_1 T = T_1 - T_2 = T_4 - T_3 \text{ or } \Delta_2 T = T_1 - T_4 = T_2 - T_3$$

Figure 2:
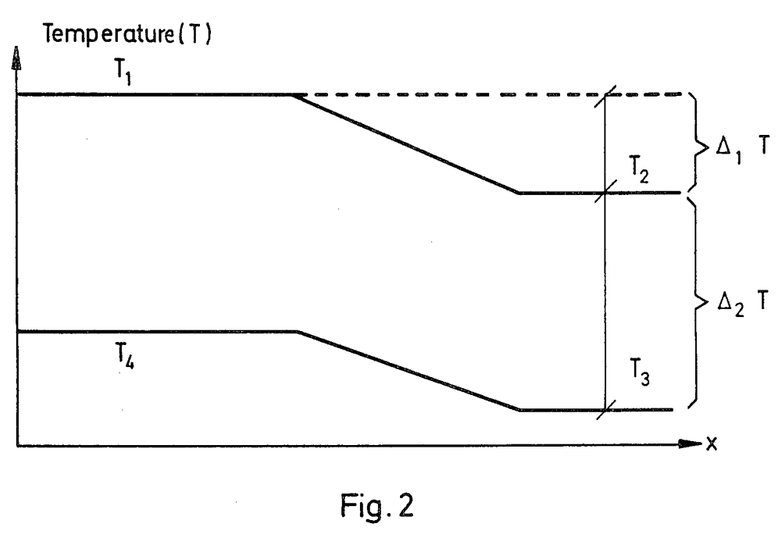
FIG. 2 is the temperature curve in the feed line and the return line connected by a heat-conducting section.

Assuming that heat conduction is effected exclusively in a direction normal to the axis of symmetry S, which can be achieved with sufficient accuracy by a very small distance between feed line and return line at the heat-conducting section, the temperature curve shown in FIG. 2 is obtained. Since the temperature difference between two temperature measuring points at the feed line and at the return line, which are symmetric to the axis of symmetry S, is always the same, the amount of heat conveyed per unit time through the heat-conducting section is:

$$\dot{Q}_1 = \alpha \cdot \Delta_2 T \tag{I}$$

(simplified heat exchanger formula). $\alpha$ is a "heat transmission coefficient" which is obtained by combining the coefficient of heat transfer and the coefficient of thermal conductivity. It depends exclusively on the geometry and can be influenced as desired by design measures in order to achieve proportionality between temperature difference and added and removed heat, as outlined in the foregoing.

The water arriving at point 4 is heated by the heating system to the temperature $T_1$. Similarly, the water arriving at point 2 is cooled down to temperature $T_3$ by the consumption of heat in the building. The amount of heat transmitted to the building per unit time is:

$$\dot{Q}_2 = \phi \cdot c_w \cdot \Delta_2 T \tag{II}$$

In this equation $\phi$ is the mass flow (g/s °C.) and $c_w$ the specific heat of the water (cal/g). It has been assumed here that $c_w$ is independent of temperature. In other cases the following calculation has to be generalized.

It should be noted, however, that the amount of heat $Q_1$ released through heat-conducting section 5 reduces the temperature of the fluid in the feed line from $T_1$ to $T_2$ or increases the temperature of the fluid in the return line from $T_3$ to $T_4$. Hence, the following equation is also applicable:

$$\dot{Q}_1 = \phi \cdot c_w \cdot \Delta_1 T \tag{III}$$

Taking into account equation (I) yields:

$$\phi \cdot c_w = \alpha \cdot \frac{\Delta_2 T}{\Delta_1 T} \tag{IV}$$

If this relation is substituted into equation (II), the heat flow results to be:

$$\dot{Q}_2 = \alpha \cdot \frac{(\Delta_2 T)^2}{\Delta_1 T} \tag{V}$$

In addition to the temperature differences $\Delta_1 T$ and $\Delta_2 T$, this equation also contains the above-defined constant $\alpha$.

The temperature difference $\Delta_1 T$ should be as small as possible, not only to permit the heat exchanger to be dimensioned as small as possible, but also in order to avoid unnecessarily high temperatures $T_1$ or $T_4$. As a rule, a temperature difference of about 1° C. is sufficient.

Figure 3:
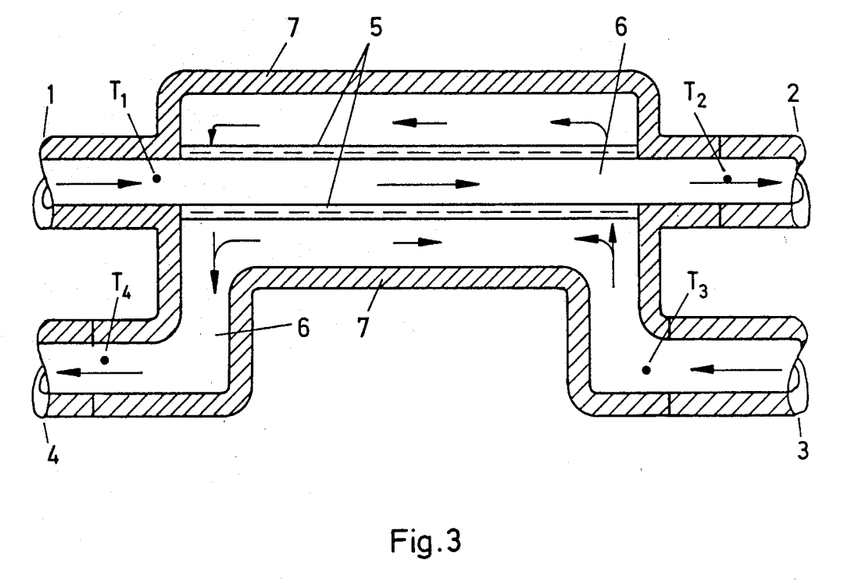
FIG. 3 is a cross-sectional side elevational view of a design of the heat-conducting section.

FIG. 3 shows one embodiment of the heat-conducting section according to the invention which is of very compact design and involves practically no pressure loss. In this case the fluid in the feed line serves for heating the fluid in the return line to an appropriate temperature. The heat-conducting section according to the invention, 5, is provided with connections, 1, 2, 3 and 4 which can be mounted in the hot water circuit. The temperatures $T_1$ to $T_4$ are measured at these connections, e.g. on the outside of the tube wall; the temperatures $T_1$ and $T_3$ are measured relatively close to heat-conducting section 5, and the temperatures $T_2$ and $T_4$ relatively far from heat-conducting section 5. Should it be necessary in special cases to use relatively short connecting branches, uniform temperature distribution upstream of the temperature measuring points must be ensured by taking special measures, e.g. by providing mixing devices at appropriate points 6. The total system excluding the connecting branches is insulated against the outside by heat insulation 7.

The temperature sensors in this embodiment are N.T.C. resistors. These resistors are appropriately connected and cyclically interrogated. The results of the interrogations are passed on in binary form to a computer via a signaling line. The computer then checks the identity of the equation:

$$T_1 - T_2 = T_4 - T_3$$

and types out an error message if this relation is not satisfied within specific tolerances. In addition, it calculates the heat flow $\dot{Q}_2$ in accordance with equation (V). This value is first added into a memory which sums up the heat consumption. In addition, it is used for updating the mean heat consumption $\overline{Q}_2$, which is stored in a second memory, according to the following equation:

$$\overline{Q}_2(t + \Delta t) = \frac{1}{256} Q_2(t + \Delta t) + \frac{255}{256} \overline{Q}_2(t) \qquad \text{(VI)}$$

so that the value $\overline{Q}_2$ (t+$\Delta$t) corresponds to an exponential smoothing. This value is indicated.

Figure 4:
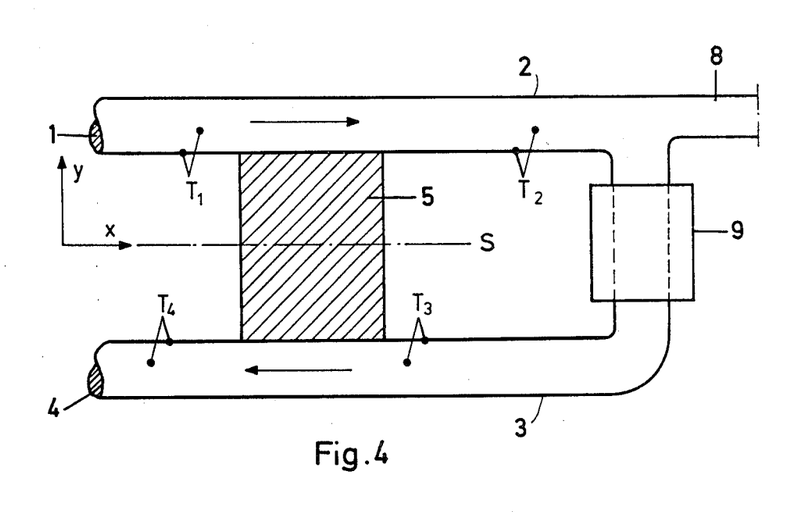
FIG. 4 is a side elevational view of a fluid-conveying system operating according to the circulation principle, with the temperature difference being generated by cooling or heating, and with a heat-conducting section between the feed line and the return line.

In the following, the method according to the invention is described by the example of a fuel supply system. FIG. 4 shows a piece of the feed line between points 1 and 2, in which the fuel flows from 1 to 2. Betweens points 3 and 4 there is the return line in which a smaller amount of fuel flows from 3 to 4, because a specific amount of fuel is branched off via consumption line 8. Heating conducting section 5 which is shown as hatched area is arranged between feed line and return line.

The temperatures of the fuel in the feed line and in the return line are different, which is due either to cooling by head wind or propeller or to heating by injection pump or carburetor. In systems where a temperature change is not produced automatically, a heating or cooling device 9 is arranged behind consumption line 8.

In the system depicted in FIG. 4 the fuel passes point 1 at the temperature $T_1$ and remains at the temperature level $T_1$ until heat conduction starts. From this point a specific amount of heat is led off from the return line through heat-conducting section 5 if cooling is provided, so that the fuel in the feed line downstream of heat-conducting section 5 has a lower temperature $T_2$ at which it passes point 2. After the amount to be consumed has been branched off through consumption line 8 and passed through cooler 9, the residual fuel arrives at point 3 at the temperature $T_3$. A specific amount of heat is supplied from the feed line through heat-conducting section 5, so that the residual fuel leaves the heat-conducting section at the higher temperature $T_4$ at which it also passes point 4. Subsequently, the residual fuel is returned to the tank.

In the specific heat of the warm fuel almost equals that of the colder fuel (within the necessary measuring accuracy, this means a temperature difference of merely 5° C.), the following relations are applicable:

$\Delta_1 T = T_1-T_2$, $\Delta_2 T = T_2-T_3$, $\Delta_3 T = T_4-T_3$ and $\Delta_4 T = T_1-T_4$.

Figure 5:
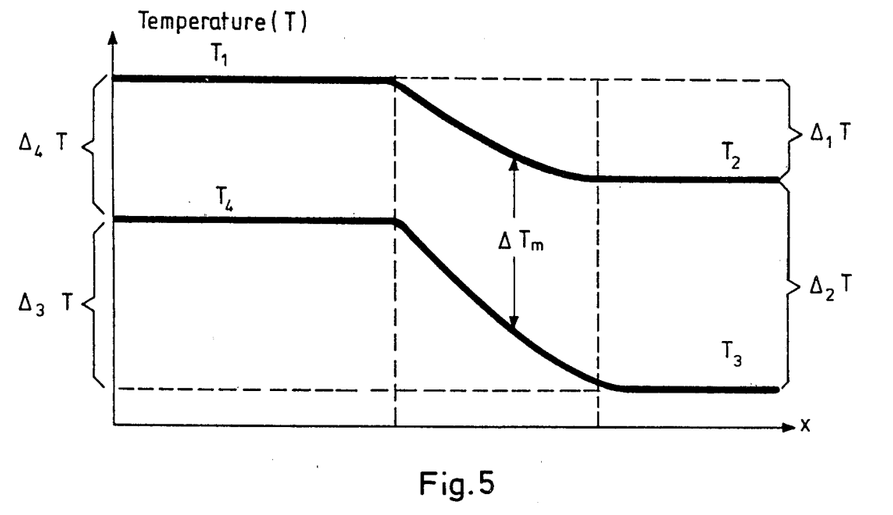
FIG. 5 is the temperature curve in the feed line and the return line for the conveying system shown in FIG. 4, as a function of time.

Assuming that heat conduction takes place exclusively in a direction normal to the axis of symmetry S, the temperature curve shown in FIG. 5 is obtained. As the temperature differences between two points at the feed line and the return line, which are symmetric to the axis of symmetry S, are different depending on their position, the total amount of heat $\dot{Q}_1$ that is conveyed through the heat-conducting section per unit time is $$\dot{Q}_1 = \alpha \cdot \Delta T_m \qquad \text{(VII)}$$

In this formula $\Delta T_m$ is the average effective temperature difference, which is obtained as follows:

$$T_m = \frac{\Delta_2 T - \Delta_4 T}{\ln\left(\frac{\Delta_2 T}{\Delta_4 T}\right)} \qquad \text{(VIII)}$$

$\alpha$ is a "heat transmission coefficient" which is obtained by combining the heat transfer and heat conductivity coefficients. It depends exclusively on geometry and material of the heat-conducting section and can be influenced as desired by design measures in order to achieve proportionality between the mean temperature difference $T_m$ and the heat added and removed as outlined in the foregoing.

The amount of heat $\dot{Q}_1$ conveyed through the heat-conducting section per unit time reduces the temperature in the feed line from $T_1$ to $T_2$ and raises the temperature in the return line from $T_3$ to $T_4$. Hence:

$$\dot{Q}_1 = \phi_{feed} \cdot C_K \cdot \Delta_1 T = \phi_{return} \cdot C_K \cdot \Delta_3 T \qquad \text{(IX)}$$

$C_K$ is the specific heat of the fuel.

If equation (VII) is taken into account, the following relations result:

$$\phi_{feed} \cdot C_K = \alpha \frac{\Delta T_m}{\Delta_1 T} \qquad \text{(X)}$$

$$\phi_{return} \cdot C_K = \alpha \frac{\Delta T_m}{\Delta_3 T} \qquad \text{(XI)}$$

The consumption or the mass flow $\phi$ is obtained as difference between feed and return:

$$\phi \cdot C_K = \phi_{feed} \cdot C_K - \phi_{return} \cdot C_K = \alpha \cdot \Delta T_m \cdot \left(\frac{1}{\Delta_1 T} - \frac{1}{\Delta_3 T}\right) \qquad \text{(XII)}$$

In addition to the temperature differences $\Delta_1 T$, $\Delta_2 T$, $\Delta_3 T$ and $\Delta_4 T$ ($\Delta T_m$ results from $\Delta_2 T$ and $\Delta_4 T$), this equations also contains the constant $\alpha$ discussed in the foregoing and the specific heat of the fuel $C_K$. If the flow volumes in the feed line and the return line are identical because no consumption line is branched off, equations (X) and (XI) are used analogously to determine the mass flow.

The temperature differences $\Delta_1 T$ and $\Delta_3 T$ should be as small as possible, not only to permit the heat-conducting section to be dimensioned as small as possible, but also in order to avoid unnecessarily high temperature differences $\Delta_2 T$ or $\Delta_4 T$. As a rule, temperature differences of about 2° to 3° C. are sufficient. If the heat-conducting section is suitably dimensioned, this results in temperature differences $\Delta_1 T$ and $\Delta_3 T$ of 0.5° to 1° C.

These considerations apply analogously but with opposite signs if heating is provided instead of cooling. According to the invention, the feed line and the return line are connected by means of the heat-conducting section, and a partition wall with greatly enlarged surface area is provided for heat transfer. The temperatures can be measured at connecting branches attached to the heat-conducting section on the outside of the tube wall: temperatures $T_1$ and $T_3$ can be measured relatively close to the heat-conducting section, and temperatures $T_2$ and $T_4$ relatively far from the heat-conducting section. Should it be necessary in special cases to use relatively short connecting branches, uniform temperature distribution upstream of the temperature measuring points must be ensured by taking special measures, e.g. by providing mixing devices at appropriate points. The total system excluding the connecting branches is heat-insulated from the outside.

Advantageous temperature sensors are N.T.C. resistors or thermocouples. These sensors are appropriately connected and cyclically interrogated. The results of the interrogations are passed on in binary form to a computer via a signaling line. The computer then checks the identity of the equation $$\Delta_1 T + \Delta_2 T = \Delta_3 T + \Delta_4 T$$

and types out an error message if this relation is not satisfied within specific tolerances. In addition, it calculates the fuel consumption $\phi$ in accordance with equation (XII). This value is first added into a memory which sums up the fuel consumption $\phi$. In addition, it is used for updating the mean fuel consumption $\phi_m$ within a specific period of time; this is stored in a second memory, e.g. according to the following equation:

$$\phi_m(t + \Delta t) = \frac{1}{16} \phi(t + \Delta t) + \frac{15}{16} \phi_m(t) \qquad \text{(XIII)}$$

so that the value $\phi_m(t+\Delta t)$ corresponds to an exponential smoothing. This value is indicated.

The above values can be cyclically shown on a display together with other necessary data such as time, etc. Exponential smoothing was selected in this case because the user is more interested in integral information on the fuel consumption, e.g. within the last 30 seconds, than in information about the fuel consumption or heat consumption at a specific point of time. At the same time exponential smoothing permits a four-digit output, whereas in the case of direct indication of the instantaneous heat flow only two digits can be indicated for reasons of measuring accuracy.

We claim:

1. Device for measuring the mass flow and the heat flow of fluid in a fluid conveying system that is connected to means which consumes heat from or provides heat to such fluid flow, which consists essentially of (i) two fluid-carrying lines, one line being the fluid feed line and the other being the fluid return line, (ii) a heat-conducting section positioned between the two fluid-carrying lines, at least a cross-sectional portion of said heat-conducting section which is transverse to the heat flow path through said heat-conducting section consisting essentially of a material of low-thermal conductivity, fluid-solid interfaces being formed between the fluid in the feed line and the heat-conducting section and between the fluid in the return line and the heat-conducting section, such two interfaces forming two heat transfer zones, and the heat-conditioning section have heat transmission properties such that the heat-conducting section has a thermal impedance which is relatively higher than the thermal impedance of each of the two interfaces between the fluid and the heat-conducting section, and (iii) at least one temperature sensor located in each of the two fluid-carrying lines immediately at or close to an edge of an end of the heat-conducting section, one of the fluid carrying lines having two temperature sensors located therein, one of such two temperature sensors being located upstream and the other of such two temperature sensors being located downstream of the appropriate end of the heat-conducting section, the temperature differentials between at least two pairs of such temperature sensors providing a measurement of the mass flow and the heat flow of the fluid.

2. Device as claimed in claim 2 wherein the interfaces between the fluid and the heat-conducting section each have a large surface area.

3. Device as claimed in claim 1 or 2 wherein each of the temperature measuring points $T_1$, $T_2$, $T_3$ and $T_4$ is located in one of the fluid-carrying lines close to a separate end of one of the two heat transfer zones of the heat-conducting section, at least three of such temperature measuring points containing a temperature sensor and being connected to an electronic unit for evaluating the measured temperature values.

4. Device as claimed in claim 3 wherein only three of the four temperature measuring points $T_1$, $T_2$, $T_3$ and $T_4$, located upstream and downstream of the heat-conducting section in the fluid-carrying tubes, are provided with a temperature sensor and two temperature differences can be formed from the three measured values and supplied to the evaluating unit.

5. Device as claimed in claim 4 wherein the fluid-carrying lines are directly connected, the partition wall between them serving as the heat-conducting section.

6. Device as claimed in claim 4 wherein the fluid-carrying lines are arranged concentrically in countercurrent flow, the wall of the internally-coated fluid-carrying line serving as the heat-conducting section.

7. Device as claimed in claim 4 wherein the heat-conducting section consists of glass or a composite material, which has at least one distinct element which has a low thermal conductivity coefficient.

8. Device as claimed in claim 7 wherein the composite material is enamel-coated steel or plastic-coated steel.

9. Device as claimed in claim 4 wherein a consumption line is branched off between the fluid-carrying lines to determine the mass flow.

10. Device as claimed in claim 9 wherein the fluid-carrying lines are connected by a cooling or heating zone.

11. Device as claimed in claim 3 wherein the heat-conducting section consists of glass or a composite, which has at least one distinct element which has a low thermal conductivity coefficient.

12. Device as claimed in claim 1 wherein the fluid-carrying lines are directly connected, the partition wall between them serving as the heat-conducting section.

13. Device as claimed in claim 1 wherein the fluid-carrying lines are arranged concentrically in counter-current flow, the wall of the internally-located fluid-carrying line serving as the heat-conducting section.

14. Device as claimed in claim 1 wherein the heat-conducting section consists of glass of a composite material.

15. Device as claimed in claim 14 wherein the composite material is enamel-coated steel or plastic-coated steel.

16. Device as claimed in claim 1 wherein a consumption line is branched off between the fluid-carrying lines to determine the mass flow.

17. Device as claimed in claim 1 wherein the fluid-carrying lines are connected by a cooling or heating zone.

18. Method for determining the mass flow of a fluid in a fluid conveying system having a fluid feed line and a fluid return line that are connected to means which consumes heat from or provides heat to such fluid flow, a heat-conducting section positioned between the two feed lines, thereby forming two heat transfer interface zones, at least a cross-sectional portion of said heat-conducting section which is transverse to the heat flow path through said heat-conducting section consisting essentially of a material of low-thermal conductivity, the heat-conducting section having heat transmission properties such that the heat-conducting section has a thermal impedance which is relatively higher than the thermal impedance of each of the two heat transfer interface zones, which is potentially possible due to the heat transmission properties of such two heat transfer interface zones, and at least one temperature sensor located in each of the two fluid-carrying lines immediately at or close to an edge of an end of the heat-conducting section, one of the fluid-carrying lines having two temperature sensors located therein, one of such two temperature sensors being located upstream and the other of such two temperature sensors being located downstream of the appropriate end of the heat-conducting section, comprising the steps of measuring the temperatures or temperature differences of the fluid immediately at or close to the ends of the two heat transfer interface zones in the feed line and the return line, a temperature change or difference being produced between the fluid in the feed line and the fluid in the return line, and a defined amount of heat being conveyed per unit time from the feed line to the return line or vice versa through the heat-conducting section, and deriving the mass flow of the fluid from the measured temperature differences.

19. Method as claimed in claim 18 wherein a temperature change of less than 5° C. is produced between the fluid in the feed line and the fluid in the return line.

20. Method as claimed in claim 19 or 20 wherein the heat transfer at the interfaces between the heat-conducting section and fluid is high and the thermal conductivity within the heat-conducting section is low.

21. Method as claimed in claim 20 wherein the difference of the mass flows in the feed line and the return line is formed in order to determine the mass flow in the consumption line of a conveying system operating according to the circulation principle, that is, wherein the consumption line is branched off and a heating or cooling device is located downstream of the branch point of the consumption device.

22. Method as claimed in claim 21 wherein the temperature change between the feed line and the return line is produced downstream of the branching point of the consumption line.

23. Method as claimed in claim 18 wherein the difference of the mass flows in the feed line and the return line is formed in order to determine the mass flow in the consumption line of a conveying system operating according to the circulation principle, that is, wherein the consumption line is branched off and a heating or cooling device is located downstream of the branch point of the consumption device.

24. Method as claimed in claim 23 wherein the temperature change between the feed line and the return line is produced downstream of the branching point of the consumption line.

* * * * *